United States Patent [19]

Lyons

[11] 3,798,084

[45] Mar. 19, 1974

[54] SIMULTANEOUS DIFFUSION PROCESSING

[75] Inventor: Vincent J. Lyons, Poughkeepsie, N.Y.

[73] Assignee: International Business Machines Corporation, Armonk, N.Y.

[22] Filed: Aug. 11, 1972

[21] Appl. No.: 279,902

Related U.S. Application Data

[63] Continuation of Ser. No. 2,287, Jan. 12, 1970, abandoned.

[52] U.S. Cl. .................. 148/189, 148/186, 148/190

[51] Int. Cl. .................. H01l 7/44

[58] Field of Search .................. 148/186, 189, 190

[56] References Cited

UNITED STATES PATENTS

| | | | |
|---|---|---|---|
| 3,649,387 | 3/1972 | Frentz et al. | 148/187 |
| 3,658,606 | 4/1972 | Lyons et al. | 148/187 |
| 3,615,945 | 10/1971 | Yokozawa | 148/190 |
| 3,249,831 | 5/1966 | New et al. | 148/190 X |
| 3,215,571 | 11/1965 | Frieser | 148/189 |
| 3,473,980 | 10/1969 | Beadle et al. | 148/189 |

FOREIGN PATENTS OR APPLICATIONS

| | | | |
|---|---|---|---|
| 945,249 | 12/1963 | Great Britain | 148/189 |
| 1,201,428 | 8/1970 | Great Britain | 148/189 |

*Primary Examiner*—G. T. Ozaki
*Attorney, Agent, or Firm*—David M. Bunnell

[57] ABSTRACT

Emitter and base regions of a semiconductor device may be formed simultaneously by a capsule diffusion with a source containing both N type and P type dopants. The dopants utilized must have substantially different diffusion rates. For instance, for a silicon semiconductor substrate, the source may be formed of boron and arsenic-doped silicon.

8 Claims, 3 Drawing Figures

TWO-ZONE TEMPERATURE PROFILE

SIMULTANEOUS DIFFUSION PROCESSING

This is a continuation of application Ser. No. 2,287 filed Jan. 12, 1970 and now abandoned.

BACKGROUND OF THE INVENTION

1. Field of the Invention

The present invention relates to capsule diffusion processing.

2. Description of the Prior Art

Two basic types of systems have been utilized to accomplish the diffusion of a conductivity-type determining impurity into a semi-conductive body.

These two systems are known, respectively, as the "closed tube" system and the "open tube" system.

The present invention relates to the "closed tube" system in which the semiconductor body is enclosed in a closed capsule formed of a high temperature resistant material. Of course, the conductivity-type determining impurity is also enclosed in said system before the vessel is sealed from the atmosphere. Typically, the conductivity-type determining impurity is present as a doped impurity in a separate granulated mass of the same material of which the semiconductor body is formed. Thereafter, the vessel or capsule is heated to an appropriate temperature to thereby vaporize the conductivity-type determining impurity and to achieve diffusion of the impurity into the semiconductor body.

One of the main advantages of the closed tube system is that once the interior of the capsule is purified, this purity is maintained throughout the diffusion process. Further, the closed tube system is basically isolated from ambient changes during the diffusion process, that is, the system is isolated from the ambient surroundings and may proceed relatively undisturbed throughout long processing conditions.

Of course, drawbacks to the closed system are that obtaining a highly clear or pure interior in the capsule is difficult, and the capsule can only be used once since it is destroyed when opened.

Thus, the art of capsule diffusion is well known. However, such capsule diffusions have involved the use of two different types of sources and separate diffusion steps for each impurity or conductivity-type determining material.

Further, although the prior art has utilized sources wherein two different types of impurities are present in the one source, for instance, in U.S. Pat. No. 3,178,798, Marinace, in this type of prior art the processes involved have always been directly vapor growing a semiconductor, wherein halogen transport systems have been used and wherein combined halide vapors are formed.

The prior art has further practiced double diffusion processes. However, the art has always involved a doped oxide layer on the semiconductor substrate and diffusing a rapid diffuser, such as aluminum, into the bulk of the semiconductor via the doped oxide layer.

SUMMARY OF THE INVENTION

The present invention, of course, overcomes disadvantages encountered in each of the above instances.

For instance, with respect to the single impurity containing source, the present invention enables only one source for a double simultaneous diffusion to be utilized.

With respect to the prior art which has used a double impurity containing source, the present invention provides a new application for a double impurity containing source, the prior art only growing semiconductors per se, and not forming active devices.

With respect to the known prior art double diffusion processes, the present invention has no need for an impurity doped oxide which must be formed prior to diffusion.

The present invention essentially provides that by using a double impurity containing single source, the impurities having significantly different rates of diffusion, both emitter and base regions in an active semiconductor device can be formed with a single thermal cycle or diffusion step in the novel capsule diffusion process of the present invention. In one embodiment, a double impurity containing homogenized source is used.

It is accordingly one object of the present invention to provide a novel capsule or "closed tube" process.

It is a further object of this invention to provide a capsule diffusion process wherein a single source containing at least two different impurities is utilized.

It is still yet another object of this invention to provide a process for forming active semiconductor devices wherein both emitter and base regions can be formed by a single thermal cycle utilizing a single impurity source.

These and other objects of the present invention will become clear upon a reading of the following description.

DETAILED DESCRIPTION OF THE PREFERRED EMBODIMENTS

Figure 1:
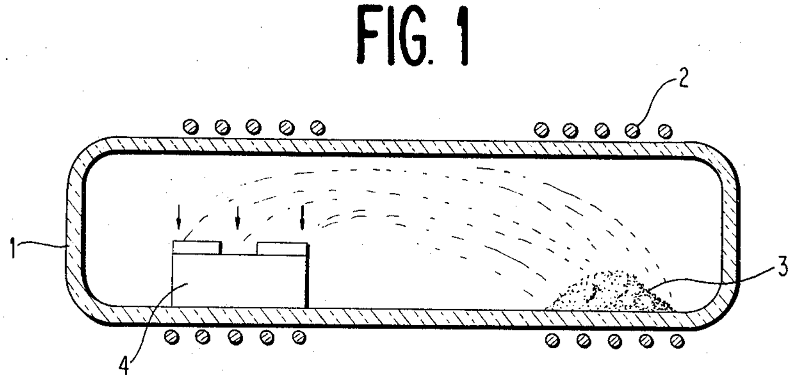
FIG. 1 schematically illustrates the capsule diffusion process of this invention.

The present invention provides a method for simultaneously diffusing emitter and base regions of a semiconductor device during a single thermal cycle.

The prior art has been heretofore discussed, and it will be appreciated that the present invention provides several advantages thereover. The basic change, of course, comprises the use of a capsule diffusion source containing both an N-type dopant and a P-type dopant, and the subsequent use of this source powder during a capsule diffusion. Of course, the two or more impurities could both be N-type, or both P-type, or two N-type and one P-type, etc.

The concentrations of the impurities in the source powder will, of course, basically be determined by the device structure requirements, e.g., $C_O$, $X_J$, etc. Where $C_O$ is the surface concentration of impurity in atoms/cc and $X_J$ is the depth of the PN junction in micro inches.

It will further be appreciated that although boron and arsenic are the impurities discussed in the following example, other P and N impurities can be used. And, although silicon is the semiconductor substrate in the following example, it will be obvious that other semiconductors can be used.

Finally, although a powder or granulate of the source powder is disclosed in the following example, it will be obvious that both pellets, wafers, etc., can be used as a substitute for the granulate. A granulate or powder is used in this example only because it is proven to be the most convenient source in providing large surface area to the diffusion atmosphere.

It is important, however, in practicing this invention that the semiconductor impurities utilized have a substantially different rate of diffusion. It has generally been found that the rate of diffusion of the two impurities must differ by a factor of at least 2. The reason for this will become clear upon a reading of the example.

Assuming that the above rate of diffusion difference is met, illustrative P-type impurities which can be used are boron and gallium. Further, illustrative N-type impurities which can be used are phosphorous, arsenic, and antimony. Illustrative substrates are silicon and germanium. Needless to say, both the elemental semiconductors the II-VI and III-V compound semiconductors can be used. The exact semiconductor and/or impurity combination is not important so long as the diffusion rate difference is met.

Typically, when the impurities are N-type and P-type, the concentration of the impurities in the source powder will be within the range $2 \times 10^{20}$ atoms/cc to $5 \times 10^{19}$ atoms/cc, respectively. Thus, the total impurity concentration of the source powder will be the sum of these two or $2.5 \times 10^{20}$ atoms/cc. For N—N or P—P combinations, similar values apply.

Needless to say, the invention could be used to form N-P-N devices and P-N-P devices. Further, assuming that for some reason one desired to form a compensated region, and one was willing to use materials having a substantially equal rate of diffusion, one could form a great variety of devices.

EXAMPLE 1

The invention will now be illustrated by the following example.

Reference should be made to FIG. 1 which illustrates a schematic form of the apparatus used to practice the present invention. Reference numeral 1 represents the capsule which is typically formed of a high melting point material such as quartz. To supply heat to the closed-tube system, a plurality of windings 2 connected to an appropriate source of power, not shown, can be utilized.

In the drawing, the co-doped source is represented by numeral 3. This source is in the form of a fine particulate material of an average particle size in the range of 100 to 400 mesh. In this instance, the co-doped source was formed by doping intrinsic silicon with arsenic and boron to an arsenic concentration of $2 \times 10^{20}$ atoms/cc and a boron concentration of $5 \times 10^{19}$ atoms/cc, for a total concentration of $2.5 \times 10^{20}$ atoms/cc. A slice of N-type silicon 4 having a diameter of 1.25 inches and a resistivity of 5 ohms-cm is placed in the capsule 1, and thereafter, with the silicon slice and the co-doped source therein, the capsule 1 is sealed. In this particular instance, for the N-type silicon with the indicated area approximately 5 grams of co-doped source were used. The thickness of the silicon need not be considered in the present instance, but the silicon was 0.008 inches thick.

The source in this example was prepared by mechanically mixing arsenic doped intrinsic silicon powder and boron doped intrinsic silicon powder. These were placed in a quartz capsule, and heated together. The boron vapor diffused from the boron-containing particles and proceeded to uniformly distribute throughout the total powder mass. The arsenic vaporized from the arsenic-containing silicon powders and proceeded to distribute throughout the total powder mass. After the concentrations indicated were reached, heating was stopped and the double-doped source material removed from the quartz capsule. The techniques utilized in forming the co-doped source involved the same thermal cycles as those of the prior art for single doped sources.

If desired, an easy alternative to the above is to introduce intrinsic silicon, elemental boron and elemental arsenic into a quartz capsule, evacuate the capsule and seal and heat the capsule. The boron and arsenic vaporize and distribute themselves in the silicon.

After sealing, the capsule was inserted into the furnace windings 2 which were powdered to maintain a temperature of 1,000°C. Thus, the source and wafer were heated simultaneously, and ultimately achieved identical temperature.

After heating at the indicated temperatures for approximately 30 minutes, steady state conditions were reached in the capsule.

After steady state conditions were reached, heating was continued for approximately 55 minutes after which the tube was withdrawn from the system.

Removal of the silicon wafer from the capsule discloses a junction formed at the intersection of the boron zone and the arsenic zone, the boron being diffused to a depth of 30 micro inches and the arsenic being diffused to a depth of 25 micro inches. Since the boron diffused to a depth greater than the arsenic, it is apparent that at least one junction will occur.

It can thus be seen why it is necessary that one of the impurities have a substantially greater rate of diffusion than the other. If this was not the case, then diffusion would occur to the same extent for both, and it would be impossible to form a junction because to do so it is necessary that one impurity diffuses to a greater extent than the other impurity. A junction is, at this point, illustrated in FIG. 2 of the drawings. It will be apparent that the larger zone represents the faster diffusing impurity, in this case boron, and the smaller zone 9 represents the slower diffusing impurity arsenic.

Figure 2:
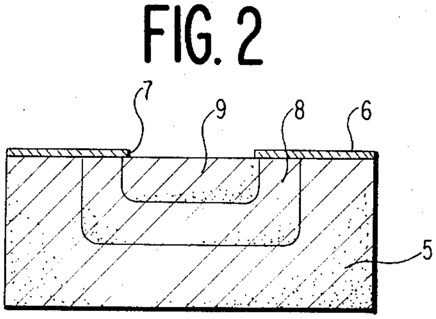
FIG. 2 is a sectioned view of a substrate which has been diffused with a single source containing two or more impurities according to the invention.

Obviously, to form a useful device as shown in FIG. 2, the silicon substrate 5 would have to be coated with some type of impurity resistant mask 6, for instance, silicon dioxide and the impurity selectively diffused through a hole 7 in the mask into the silicon. By this means, the base 8 and emitter 9 regions are easily formed. For instance, in the example the base, after appropriate contacts, would be the boron diffused zone, whereas the smaller "interior" zone formed by the arsenic would be the emitter. It is a smaller zone, of course, because it can not diffuse as fast as the boron.

EXAMPLE 2

In Example 1 a co-doped source was utilized which is formed by a process similar to those of the prior art for forming single-doped sources except that two dopants were utilized. The following example deals with the use of a homogenized double-doped source. The basic concept of homogenization is discussed in co-pending U.S. application Ser. No. 811,931, filed Apr. 1, 1969 and now U.S. Pat. No. 3,658,606.

Basically, however, the prior art has known three main methods of providing single source materials. For instance, using arsenic as the single impurity, a mixture of arsenic and silicon could merely be heated together to bring arsenic diffusion into the silicon. In another method, a measured amount of arsenic can be dissolved in molten silicon, the arsenic allowed to melt, and the mixture frozen. This can be called a "freeze-out" source. In a final method, a single crystal source can be pulled from a molten mixture of silicon and arsenic and pulverized into particles. Each of the above techniques will yield a source which, because of their multi-phase nature, will not yield reproducible device fabrication schemes. Thus, each source requires a different set of diffusion conditions.

In homogenization, a double-doped source is provided which enables reproducible results to be obtained on a highly consistent basis. Essentially, a source is produced which enables equilibrium conditions to be approached during the device fabrication steps. By homogenization, it is ensured that the vapor pressure or the vapor concentration of a doping impurity remains constant over a time period which is in excess of normal diffusion time. Basically, this is accomplished by preparing a source by heating the material which is the basis of the source, generally silicon, in a vapor of the dopant for a time period greatly in excess of normal diffusion times, i.e., say 50 hours.

In the following example, which deals with the preparation of a homogenized source, the arsenic vapor from the arsenic doped master source will diffuse into the boron-doped source (which is homogenized) and vice versa, to yield a final co-doped homogenized source wherein impurities will be distributed uniformly among the particles of the silicon, and wherein an almost constant vapor pressure of dopants can be obtained on a reproducible basis during device fabrication.

In forming a co-doped homogenized source with boron and arsenic, the first step is to form a homogeneous diffusion source containing 0.3 atomic percent boron. This was prepared by combining 0.33 grams of boron with 280 grams of finely divided silicon. The mixture was thoroughly mixed, placed in a capsule and heated at 1,050°C for 50 hours. The heating was accomplished in a single zone state of the art furnace because the vapor pressure of boron is relatively low. This is a homogenized single dopant source.

Figure 3:
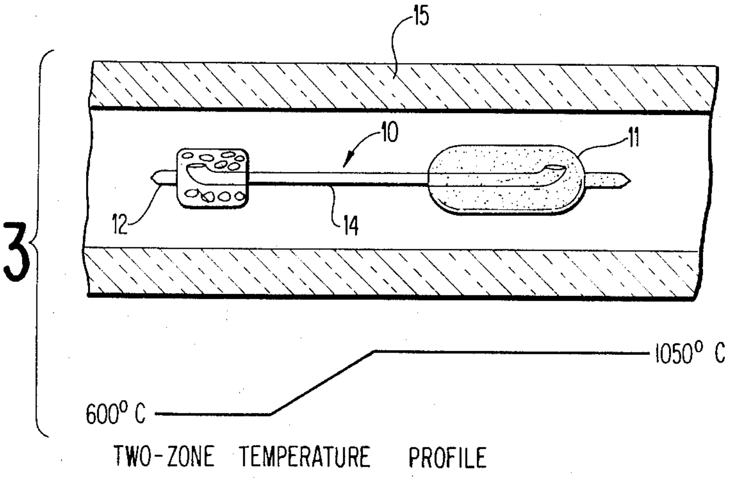
FIG. 3 is a schematic view of a closed tube homogenization apparatus which can be used in this invention.

To prepare a homogenized co-doped diffusion source in accordance with this invention which contains boron and arsenic, what may be termed an arsenic "master source" is next prepared. This will have 10 atomic percent arsenic. Intrinsic silicon is ground to less than a 149 micron (100 mesh size) particle size. 252 grams of the silicon powder is loaded into portion 11 of a quartz capsule of the type shown in FIG. 3. 75 grams of elemental arsenic are loaded into portion 12 of the capsule. Portion 12 is heated at 600°C for 8 hours and 625°C for 16 hours. Portion 11 is maintained at a temperature at 1,050°C for the entire 24 hour period. FIG. 3 is a schematic illustration of an apparatus suitable for carrying out the homogenization method of the invention. The numeral 10 illustrates the overall elongated capsule. The preferred capsule is made of quartz having two chambers 11 and 12 joined by a smaller tube 14. Typically, the capsule 10 is evacuated to a low pressure, preferably less than $5 \times 10^{-6}$ mm. of mercury. Numeral 15 represents a 2-zone furnace. The temperature gradient over the furnace is schematically illustrated below FIG. 3.

Following the heating period, 32.7 grams of the master source which results is removed and combined with the 280.33 grams of finely divided boron-doped silicon powder obtained as heretofore described. The mixture is thoroughly mixed and placed into a simple single unit capsule and heated at 1050°C for 50 hours. The resultant source, which is homogenized, contains approximately 1 atomic percent arsenic and approximately 0.3 atomic percent boron. This source can be used as in Example 1.

The homogeneous diffusion source thus comprises: a ternary alloy (Si-As-B) which includes at least a semiconductor material (Si) and at least two vaporizable dopants (As and B) for semiconductors present in a single solid phase. The silicon is a solvent, and the impurities, here As and B, can be viewed as solutes.

From the above, it will be obvious that not only can N and P-type impurities be used together, but both types of impurities could be N-type or both types of impurities could be P-type. Further, more than two impurities could be utilized, though it will be apparent that for general purposes two different impurities will suffice.

What is claimed is:

1. A method for simultaneously producing emitter and base regions in a semiconductor device which comprises: forming a mask with an opening on a semiconductor substrate heating to a diffusion temperature in a closed environment said substrate with a powdered material comprising a semiconductor doped with at least two elemental impurities having substantially different rates of diffusion, said impurities being homogeneously distributed throughout said material, and maintaining the temperature for a time sufficient to permit diffusion of said impurities into said semiconductor whereby said emitter and base regions are formed.

2. The method of claim 1 wherein said homogeneous dopant diffusion source comprises boron, arsenic and silicon.

3. The method of claim 2 wherein said homogeneous dopant diffusion source is formed by the method comprising introducing into a container a finely-ground homogeneous dopant diffusion source comprising boron and silicon, and further introducing into said elongated container a master source comprising arsenic and silicon and heating said boron, arsenic and silicon until a condition of substantial equilibrium is established within the container.

4. The method of claim 1 wherein said diffusion source comprises an alloy which includes at least a semiconductor material and at least two vaporizable elemental dopants for semiconductor materials present in a single solid state.

5. The method of claim 1 wherein said semiconductor material is selected from the group consisting of silicon, germanium, II–VI compound semiconductors, and III–V compound semiconductors.

6. A method for simultaneously producing emitter and base regions in a semiconductor device which comprises:

establishing a heating and vaporizing zone in a closed capsule;

placing a semiconductor substrate having a mask with an opening on its surface in one portion of said capsule;

placing a diffusion source which comprises a semiconductor homogeneously doped with two different types of elemental impurities having substantially different rates of diffusion in another portion of said capsule;

heating said capsule to a temperature to cause vaporization of said impurities from the said semiconductor solvent, maintaining the temperature of said diffusion mixture above said temperature for a time sufficient to permit diffusion of said impurities into said semiconductor whereby said emitter and base regions are formed, recovering a doped semiconductor from said capsule.

7. The method of claim 6 wherein said semiconductor substrate is selected from the group consisting of silicon, germanium, II–VI compound semiconductors, and III–V compound semiconductors.

8. The method of claim 6 wherein said impurities are present in a combined concentration of about $2.5 \times 10^{20}$ atoms per cc.

* * * * *